(12) United States Patent
Heuver

(10) Patent No.: US 8,371,986 B2
(45) Date of Patent: Feb. 12, 2013

(54) TRANSMISSION CONTROL DURING PARK RANGE DISENGAGEMENT

(75) Inventor: Bradley R. Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 399 days.

(21) Appl. No.: 12/792,793

(22) Filed: Jun. 3, 2010

(65) Prior Publication Data
US 2011/0297505 A1 Dec. 8, 2011

(51) Int. Cl.
*B60W 10/00* (2006.01)
*F16H 3/44* (2006.01)

(52) U.S. Cl. ............. 477/94; 475/317; 475/900

(58) Field of Classification Search .......... 477/184, 477/188, 92, 94; 74/335; 475/271–292, 475/317, 900
See application file for complete search history.

(56) References Cited

U.S. PATENT DOCUMENTS

| 6,699,155 | B2 * | 3/2004 | Nagasaka | 477/94 |
| 7,311,639 | B2 * | 12/2007 | James et al. | 477/188 |
| 2004/0043856 | A1 * | 3/2004 | Xiaolan | 475/5 |
| 2008/0035444 | A1 * | 2/2008 | Schiele et al. | 192/219.5 |
| 2011/0287884 | A1 * | 11/2011 | Unno et al. | 475/140 |

FOREIGN PATENT DOCUMENTS
JP 2001289317 A * 10/2001

* cited by examiner

*Primary Examiner* — Roger Pang
(74) *Attorney, Agent, or Firm* — James Dottavio; MacMillian, Sobanski & Todd LLC

(57) ABSTRACT

A method for controlling a vehicle transmission during a park release event includes engaging a park brake to hold vehicle wheels against rotation, holding against rotation a first component and a second component of an epicyclic gear unit connected to the wheels, releasing the park brake, selecting a transmission drive range, releasing said first component, and operating the transmission in the selected drive range.

15 Claims, 3 Drawing Sheets

| FRICTION ELEMENT APPLICATION CHART |||||||
|---|---|---|---|---|---|---|
| GEAR | 52 | 54 | 58 | 60 | 56 | 66 |
| M |  |  |  | XX |  |  |
| 1 | X |  |  |  |  | X |
| M1 | X |  |  | X |  |  |
| 2 | X |  | X |  |  |  |
| 3 | X | X |  |  |  |  |
| 4 | X |  |  |  | X |  |
| 5 |  | X |  |  | X |  |
| 6 |  |  | X |  | X |  |
| REV |  | X |  | X |  |  |

Fig. 2

TRANSMISSION CONTROL DURING PARK RANGE DISENGAGEMENT

BACKGROUND OF THE INVENTION

1. Field of the Invention

This invention relates generally to an automatic transmission, and more particularly to its control during a transition from Park to a forward drive range or a reverse drive range.

2. Description of the Prior Art

When rolling movement a vehicle is produced by placing a range selector of an automatic transmission in the Park range, the vehicle wheels are held against rotation by securing them through a drive connection to the transmission case. It is conventional practice to engage automatically a friction control element of the transmission that must be engaged in both first gear and reverse gear, when Park range is engaged.

When a transmission in this state is shifted out of Park on a grade, a large objectionable boom can occur when the stored energy of the loaded drive line is suddenly released. This abrupt release of energy can cause the driveline to oscillate for a brief but undesired period.

A need exists in the industry for a reliable technique that prevents unintended rolling of a vehicle using a park brake, and avoids a harsh, abrupt release of energy stored in the vehicle driveline when the park brake is released.

SUMMARY OF THE INVENTION

A method for controlling a vehicle transmission during a park release event includes engaging a park brake to hold vehicle wheels against rotation, holding against rotation a first component and a second component of an epicyclic gear unit connected to the wheels, releasing the park brake, selecting a transmission drive range, releasing said first component, and operating the transmission in the selected drive range.

The output shaft tie up will prevent the vehicle from rolling backwards on a hill. By applying this strategy when the vehicle is in Park, the stored energy from the vehicle's drive line with holding torque applied can be released in a controlled fashion by gradually releasing the tie-up rather releasing it abruptly. This gradual release of braking torque mitigates the boom that often occurs.

By using this strategy in Park, static engagements occur more smoothly because all torque disturbances are held internally to the transmission, and do not affect the driveline.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 2 is chart showing the operating gear and the corresponding state of friction control elements of the transmission of FIG. 1.

DESCRIPTION OF THE PREFERRED EMBODIMENT

Figure 1:
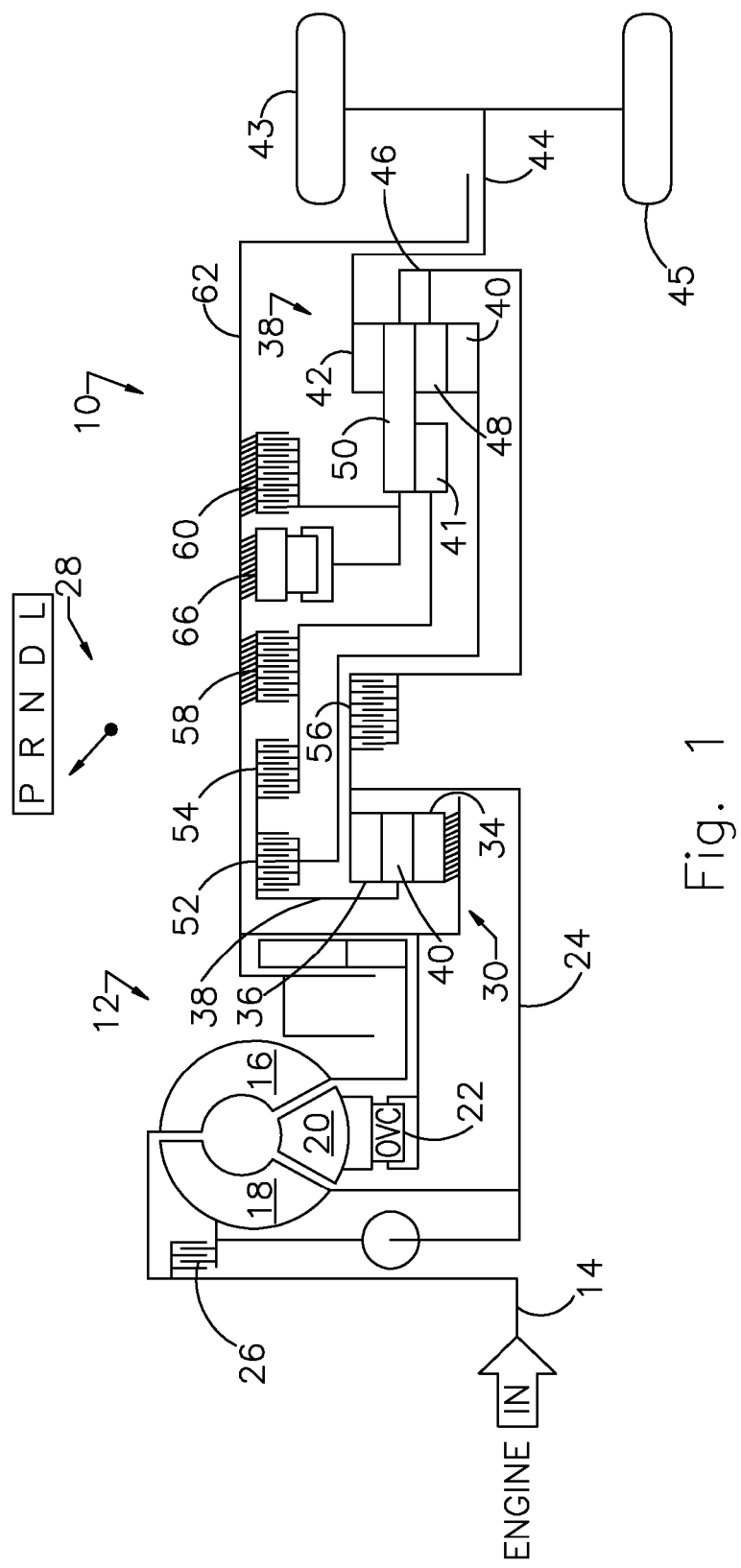
FIG. 1 is a schematic diagram showing gearing of a transmission to which the control can be applied.

Referring now to the drawings, there is illustrated in FIG. 1 a transmission 10 having a hydrokinetic torque converter 12 driveably connected to an engine crankshaft 14. The torque converter includes three bladed wheels: an impeller 16, turbine 18, and stator 20, which together define a toroidal fluid flow circuit within the casing of the torque converter. The stator 20 is supported on an overrunning brake 22, which anchors the stator to the shaft to prevent rotation of the stator in a direction opposite to the direction of rotation of the impeller and to permit free-wheeling rotation in the opposite direction. Turbine 18 is connected to a transmission input 24. A bypass or lock-up clutch 26, located between crankshaft 14 and input 24, direct mechanically connects the engine shaft 14 and input 24 when clutch 26 is engaged. When clutch 26 is disengaged, engine shaft 14 and input 24 are hydrodynamically connected through operation of the torque converter 12.

The range in which the transmission operates is selected by moving a range selector 28 manually among selected positions, PRNDL, representing park, reverse drive, neutral, forward drive and low gear, respectively.

A speed reduction epicyclic gear unit 30 includes a sun gear 34 secured to the transmission case 62, ring gear 36 connected to input 24, carrier 38 and planetary pinions 40, rotatably supported on carrier 38 and in continuous meshing engagement with sun gear 34 and ring gear 36.

A Ravigneaux gearset 38, an epicyclic gear unit, includes sun gears 40, 41; a ring gear 42, connected to the output 44 and the driven vehicle wheels 43, 45; a carrier 46; a first set of planet pinions 48, rotatably supported on carrier 44 and in continuous meshing engagement with sun gear 40; and a second set of planet pinions 50, rotatably supported on carrier 44 and in continuous meshing engagement with sun gear 41 and pinions 48.

Forward clutch C1234, a hydraulically-actuated friction control clutch 52, releasably connects carrier 24 and sun gear 40. Direct clutch C35R, a hydraulically-actuated friction clutch 54, releasably connects carrier 38 and sun gear 41. Clutch C456, a hydraulically-actuated friction clutch 56, releasably connects ring gear 36 and carrier 46. Intermediate brake C26, a hydraulically-actuated friction brake 58, releasably holds sun gear 41 against rotation on the transmission case 62. Low/reverse brake CBLR, a hydraulically-actuated friction brake 60, releasably holds carrier 46 against rotation on the transmission case 62. An overrunning clutch 66, arranged in parallel with brake 60, provides a one-way drive connection between the casing 62 and carrier 46 one rotary direction and holding carrier 46 against rotation in the opposite direction.

FIG. 2 is a chart showing the engaged and disengaged status of the clutches 52, 54, 56 and brakes 58, 60, 66 corresponding to each forward speed ratios and reverse ratio produced by transmission 10. In FIG. 2, "X" indicates engagement of the friction clutches and brakes and transmission of torque by the overrunning clutch 66. A blank in FIG. 2 indicates that no torque is being transmitted by the clutch or brake.

Figure 3:
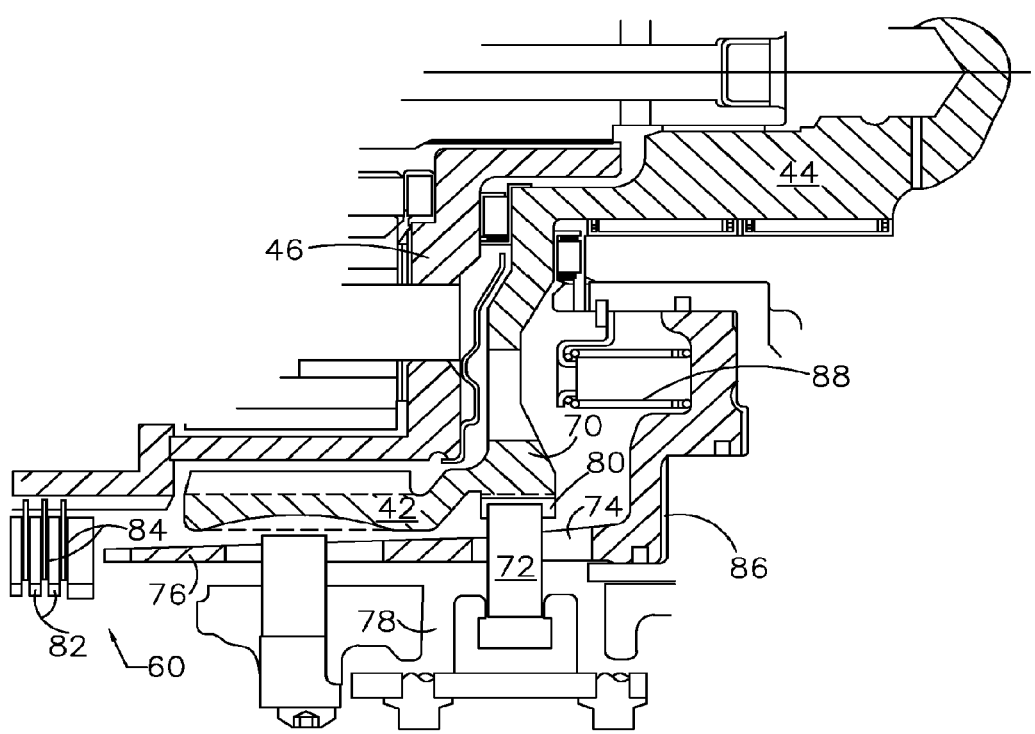
FIG. 3 is cross sectional view showing a park pawl engaged with a parking gear of the transmission of FIG. 1.

FIG. 3 shows details of a park brake assembly, which includes a park gear 70 formed integrally with ring gear 42 and output 44; a park pawl 72, which pivots through an opening 74 in the servo piston 76 that actuates brake 60 and into engagement with the teeth 80 of park gear 70; and a park support 78, secured to the transmission case 62 and supporting the pawl 72, which pivots into and out of engagement with the park gear 70.

Preferably the control elements of transmission 10, i.e., clutches 52, 54, 56 and brakes 58, 60, are hydraulically-actuated friction devices comprising interleaved plates 82 and discs 84, which are brought into mutual frictional contact by a servo piston, such as piston 76, when pressure in a servo cylinder, such as cylinder 86, is high. When pressure in the servo cylinder is relatively low, frictional contact between the plates 82 and discs 84 is released due to the force of a return spring 88, thereby disengaging the control element.

In operation, when the range selector is moved away from the Park range, pawl 72 pivots out of engagement with the teeth 80 formed on the outer periphery of park gear 70.

When the range selector is moved into the Park range, pawl 72 pivots into engagement with the teeth 80 on the park gear 70, thereby fixing the output 44 to case 62 and holding the output against rotation. When range selector is moved into the Park range, the low/reverse CLRB brake 60 and intermediate C26 clutch 58 are applied automatically. Engagement of brake 58 holds sun gear 41 against rotation on case 62, and engagement of CBLR brake 60 holds carrier 46 against rotation on case 62. While rotation of sun gear 41 and carrier 46 is prevented, each of the other components of the Ravigneaux gearset 38 capable of rotation, i.e., ring gear 42, sun gear 40, are held against rotation and the entire gear unit is locked. Because the C1234 brake 52 is released, the turbine 18 spins freely, only being resisted by open pack clutch drag, instead of the full stall of the torque converter.

When the range selector is shifted out of the Park range to the forward drive range, the low/reverse brake 60 remains engaged, the intermediate clutch 58 is disengaged and the forward clutch 52 is engaged, thereby enabling the transmission 10 to operate in the first forward gear, manual M1, as FIG. 2 shows. When the range selector is shifted out of the Park range to the reverse drive range, the low/reverse brake 60 remains engaged, the intermediate clutch 58 is disengaged and the direct clutch 54 is engaged, thereby enabling the transmission 10 to produce reverse drive, as FIG. 2 shows.

Although the control has been described with reference to a Ravigneaux gearset 38, the epicyclic gear unit that is driveably connected to the output 44 and the wheels 43, 45 may be a simple or compound planetary gear unit, and may include a Simpson gear unit and variations thereof.

In accordance with the provisions of the patent statutes, the preferred embodiment has been described. However, it should be noted that the alternate embodiments can be practiced otherwise than as specifically illustrated and described.

The invention claimed is:

1. A method for controlling a vehicle transmission during a park release event, comprising:
   (a) after a shift lever is placed in Park, using a park brake to fix a transmission output against rotation and automatically engaging two brakes that control a epicyclic gearset driveably connected to vehicle wheels;
   (b) after the shift lever is moved out of Park, releasing the park brake and at least one of the gearset brakes.

2. The method of claim 1, wherein step (a) further comprises:
   securing a park pawl to a non-rotating transmission case; and
   mutually engaging the park pawl and a park gear.

3. The method of claim 1, wherein step (a) further comprises:
   engaging a first brake that holds a first component of said gearset against rotation; and
   engaging a second brake that holds a second component of said gearset against rotation.

4. The method of claim 3, wherein step (b) further comprises disengaging one of the first brake and the second brake.

5. The method of claim 4, wherein step (b) further comprises:
   maintaining engaged the other one of the first brake and the second brake; and
   engaging a friction control element whose engagement is required to produce a gear of the selected drive range.

6. The method of claim 1, wherein step (a) further comprises:
   engaging a first brake that holds a first component of said gearset against rotation and whose engagement is required to produce reverse drive and a forward drive; and
   engaging a second brake that holds a second component of said gearset against rotation.

7. The method of claim 6, wherein step (b) further comprises disengaging the second brake.

8. The method of claim 7, wherein step (f) further comprises:
   maintaining engaged the first brake; and
   engaging a friction control element whose engagement is required to produce a gear of the selected drive range.

9. A method for controlling a vehicle transmission during a park release event, comprising:
   (a) after a shift lever is placed in Park, engaging a park brake that holds a transmission output against rotation, and automatically holding against rotation first and second components of an epicyclic gearset connected to the output;
   (b) only after the shift lever is moved to forward or reverse drive, releasing the park brake and one of the first and second components.

10. The method of claim 9, wherein step (a) further comprises:
    securing a park pawl to a non-rotating transmission case; and
    engaging mutually the park pawl and a park gear.

11. The method of claim 9, wherein step (a) further comprises:
    engaging a first brake that holds said first component against rotation and whose disengagement is required to produce the drive range; and
    engaging a second brake that holds said second component against rotation and whose engagement is required to produce the drive range.

12. The method of claim 9, wherein step (a) further comprises:
    engaging a first brake that holds said first component against rotation; and
    engaging a second brake that holds said second component against rotation and whose engagement is required to produce reverse drive and forward drive.

13. The method of claim 9, wherein step (b) further comprises maintaining said second component held against rotation.

14. The method of claim 9, wherein step (b) further comprises:
    maintaining said second component held against rotation; and
    engaging a transmission control element whose engagement is required to produce forward drive gear.

15. The method of claim 9, wherein step (b) further comprises:
    maintaining said second component held against rotation; and
    engaging a transmission control element whose engagement is required to produce reverse drive.

* * * * *